US007631700B1

(12) United States Patent
Gil

(10) Patent No.: US 7,631,700 B1

(45) Date of Patent: Dec. 15, 2009

(54) FIREFIGHTING VEHICLE

(76) Inventor: Anastasio A. Gil, 2980 NW. 79th St., Miami, FL (US) 33147

( * ) Notice: Subject to any disclaimer, the term of this patent is extended or adjusted under 35 U.S.C. 154(b) by 152 days.

(21) Appl. No.: 11/835,614

(22) Filed: Aug. 8, 2007

(51) Int. Cl.

| | |
|---|---|
| ***A62C 27/00*** | (2006.01) |
| ***A62C 31/22*** | (2006.01) |
| ***B62D 55/00*** | (2006.01) |
| ***B62D 55/06*** | (2006.01) |

(52) U.S. Cl. ............................ 169/24; 169/13; 169/70; 239/172; 180/9.1

(58) Field of Classification Search .................. 169/13, 169/16, 24, 53, 70; 180/6.7, 9.1; 239/146, 239/147, 172, 329, 548, 551

See application file for complete search history.

(56) References Cited

U.S. PATENT DOCUMENTS

| | | | | |
|---|---|---|---|---|
| 2,360,397 | A * | 10/1944 | Carpenter .................... | 169/24 |
| 6,289,995 | B1 * | 9/2001 | Fuller .......................... | 169/52 |
| 7,264,062 | B1 * | 9/2007 | Ham ........................... | 169/52 |

* cited by examiner

*Primary Examiner*—Darren W Gorman

(57) ABSTRACT

A firefighting vehicle. An illustrative embodiment of the firefighting vehicle includes a portable vehicle frame, a vehicle body carried by the vehicle frame and having a plurality of body panels disposed in angular relationship with respect to each other, a plurality of fluid openings provided in each of the plurality of body panels, a tank provided on the vehicle frame and a pump disposed in fluid communication with the tank and the plurality of fluid openings.

5 Claims, 4 Drawing Sheets

FIREFIGHTING VEHICLE

FIELD

The present disclosure relates to firefighting equipment. More particularly, the present disclosure relates to a firefighting vehicle which can be used to dispense water or other fire-quenching fluid onto a fire.

BACKGROUND

Conventional firefighting equipment includes a fire engine, which is a vehicle equipped with a water tank and nozzles to which a fire hose can be connected. In a firefighting operation, pressurized water is ejected through the fire hose onto a fire to quench the fire. However, the fire engine is typically not designed to travel into the midst of a fire to facilitate spraying of the fire from multiple directions and can only be used to spray the fire from the edge of the fire.

SUMMARY

The present invention is generally directed to a firefighting vehicle. An illustrative embodiment of the firefighting vehicle includes a portable vehicle frame, a vehicle body carried by the vehicle frame and having a plurality of body panels disposed in angular relationship with respect to each other, a plurality of fluid openings provided in each of the plurality of body panels, a tank provided on the vehicle frame and a pump disposed in fluid communication with the tank and the plurality of fluid openings.

BRIEF DESCRIPTION OF THE DRAWINGS

The disclosure will now be made, by way of example, with reference to the accompanying drawings, in which.

DETAILED DESCRIPTION

Figure 2:
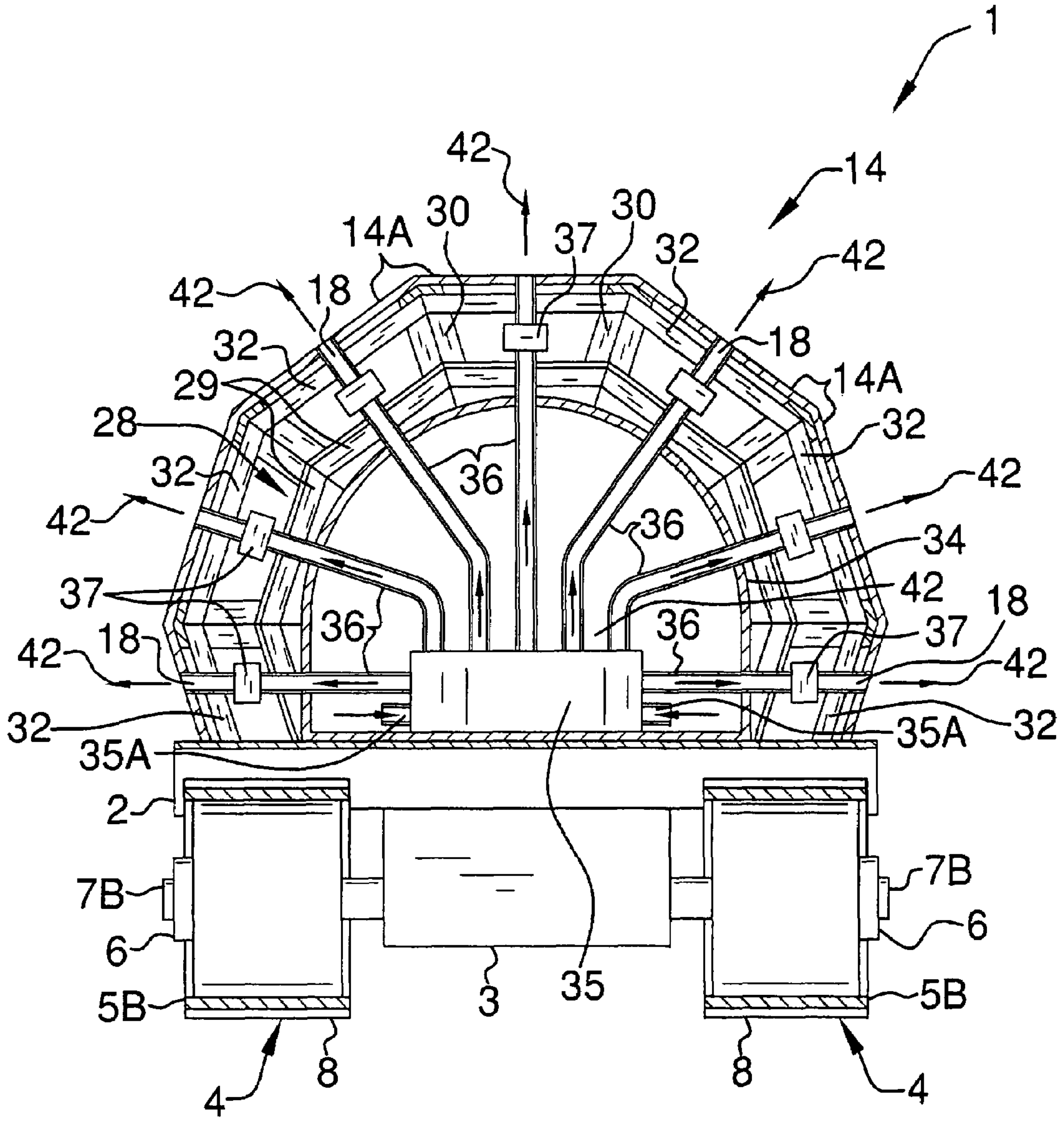
FIG. 2 is a cross-sectional view, taken along section lines 2-2 in FIG. 1, of an illustrative embodiment of the firefighting vehicle.
Figure 3:
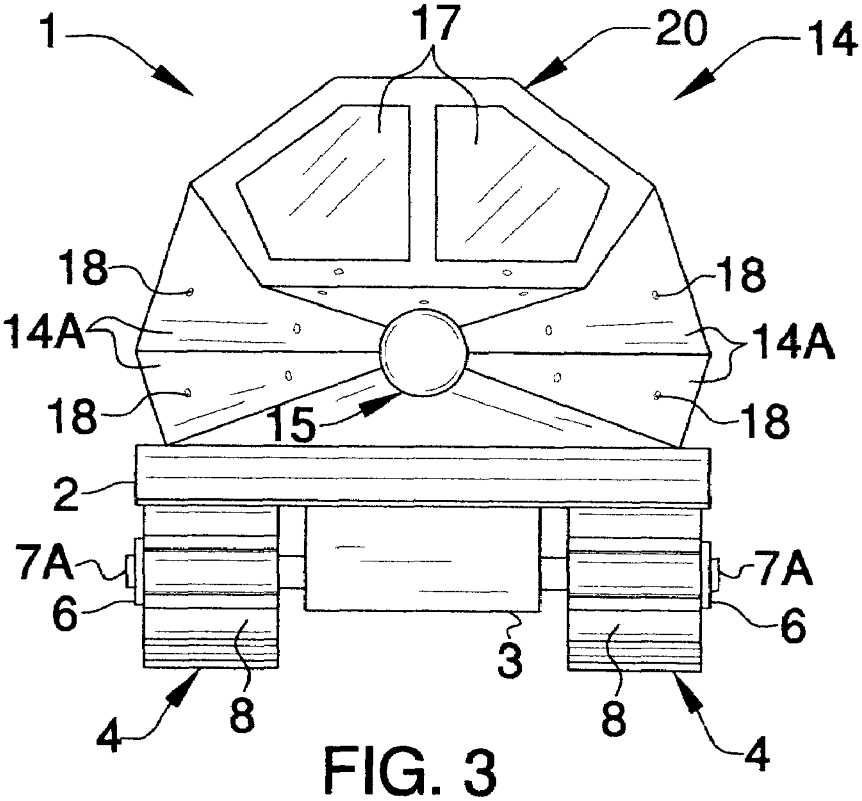
FIG. 3 is a front view of an illustrative embodiment of the firefighting vehicle.

Referring to the drawings, an illustrative embodiment of the firefighting vehicle is generally indicated by reference numeral 1. As shown in FIG. 2, the firefighting vehicle 1 includes a portable vehicle frame 2. The vehicle frame 2 may be rendered portable using any suitable mechanism which is known to those skilled in the art. In some embodiments, a pair of track assemblies 4, the details of which will be hereinafter described, render the vehicle frame 2 portable. In alternative embodiments, motor-driven wheels (not shown) are provided on the vehicle frame 2 to render the vehicle frame 2 portable.

Figure 1:
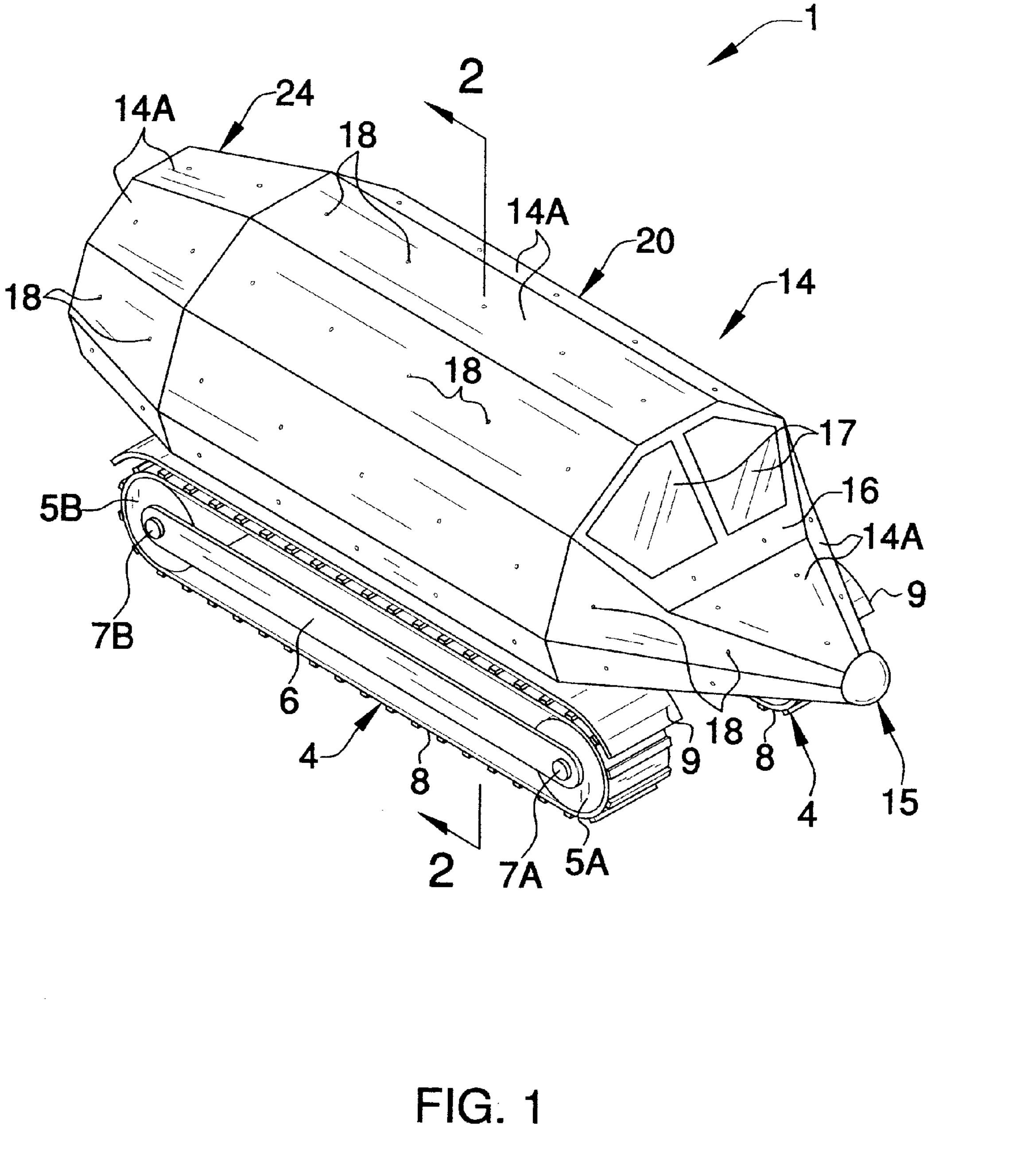
FIG. 1 is a front perspective view of an illustrative embodiment of the firefighting vehicle.
Figure 5:
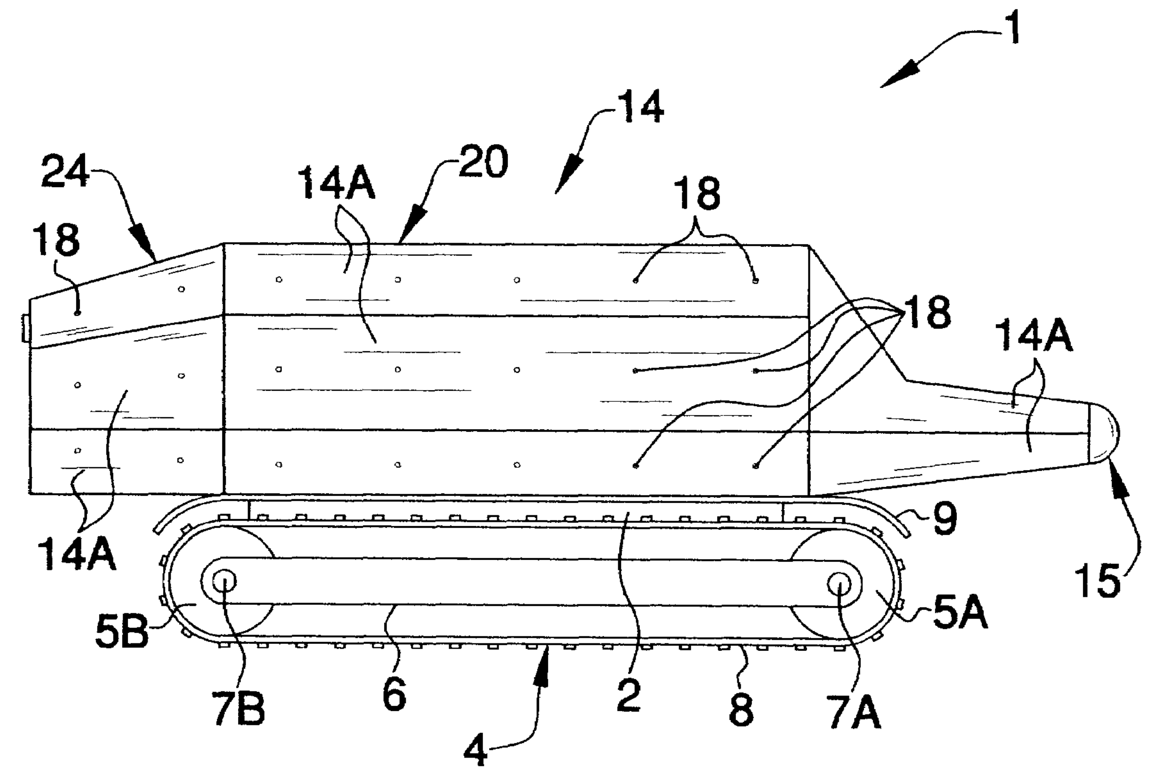
FIG. 5 is a side view of an illustrative embodiment of the firefighting vehicle.

As shown in FIG. 2, in some embodiments an engine 3, which may be diesel-powered, for example, is provided on the vehicle frame 2. Each track assembly 4 includes a front axle **7*a* and a rear axle 7*b* provided on the vehicle frame 2. At least one of the front axle 7*a* and the rear axle 7*b* is drivingly engaged by the engine 3. A pair of front track wheels 5*a* is provided on the front axle 7*a*. A pair of rear track wheels 5*b* is provided on the rear axle 7*b*. As shown in FIGS. 1 and 5, an elongated track wheel frame 6 typically connects the front axle 7*a* to the rear axle 7*b* on each side of the vehicle frame 2. An elongated, continuous track 8 is drivingly engaged by the front track wheel 5*a* and the rear track wheel 5*b* on each side of the vehicle frame 2. A track fender 9 may be provided on each side of the vehicle frame 2, over each corresponding track 8**.

A vehicle body 14 is provided on the vehicle frame 2. As shown in FIG. 2, a body support frame 28 is provided on the vehicle frame 2. In some embodiments, the body support frame 28 includes multiple inner frame sections 29 which are oriented at obtuse angles with respect to each other. Multiple connecting members 30 extend outwardly from the inner frame sections 29. Multiple outer frame sections 32 are provided on the connecting members 30. The outer frame sections 32 are oriented at obtuse angles with respect to each other. Multiple body panels **14*a*, each of which is a heat-resistant material, are provided on the outer frame sections 32 of the body support frame 28. The body panels 14*a*, like the outer frame sections 32 of the body mount frame 28, are oriented at obtuse angles with respect to each other. The body support frame 28 may have any suitable alternative design or configuration which is suitable for supporting the body panels 14*a***.

As shown in FIGS. 1 and 5, in some embodiments the vehicle body 14 includes a tapered nose body portion 15; a generally elongated main body portion 20 extending rearwardly from the nose body portion 15; and a tail body portion 24 extending rearwardly from the main body portion 20. A cabin 16 is provided typically in the nose body portion 15 of the vehicle body 14. In some embodiments, controls (not shown) for the engine 3 (FIG. 2) and for the various operational functions of the firefighting vehicle 1, which will be hereinafter described, are provided in the cabin 16. At least one seat (not shown) is typically provided in the cabin 16 to accommodate an operator or operators (not shown) of the firefighting vehicle 1. At least one window 17 is typically provided in the cabin 16. In other embodiments, the engine 3 and various operational functions of the firefighting vehicle 1 are remote-control ed.

Figure 4:
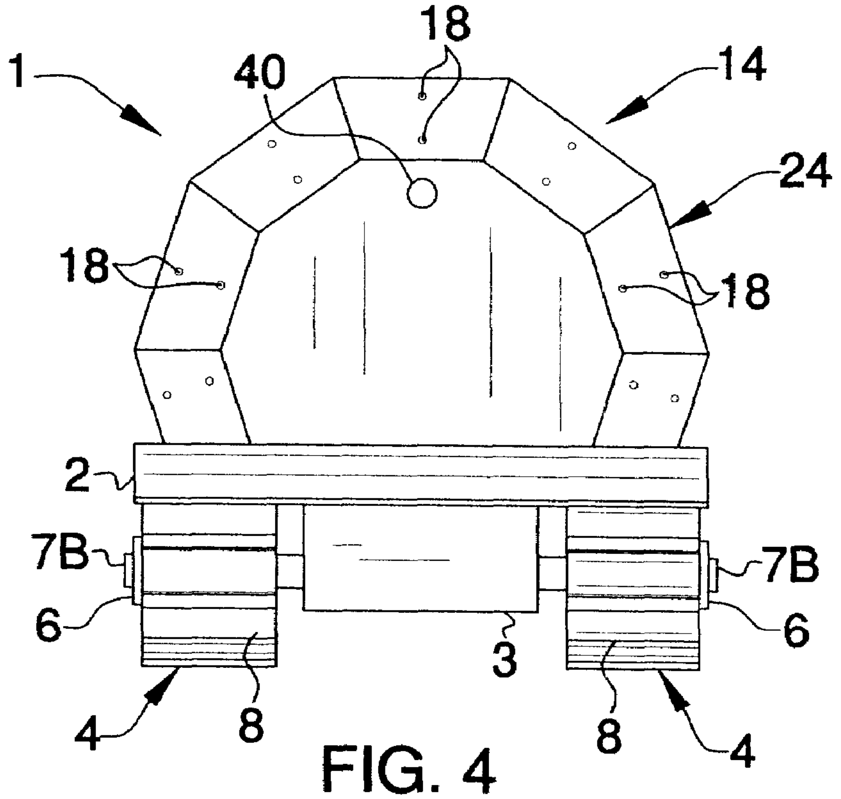
FIG. 4 is a rear view of an illustrative embodiment of the firefighting vehicle.

As further shown in FIG. 2, a tank 34 is provided on the vehicle frame 2, inside the body support frame 28. As shown in FIG. 4, a tank fill inlet 40 is provided in the vehicle body 14, such as in the tail body portion 24, for example, and disposed in fluid communication with the tank 34. A pump 35, the controls (not shown) of which are provided typically in the cabin 16, is provided typically in the tank 34. The pump 35 has at least one pump intake **35*a* which is disposed in fluid communication with the tank 34. Multiple spray conduits 36 are disposed in fluid communication with the pump 35 and extend through respective openings (not shown) provided in the tank 34 and the inner frame sections 29 and the outer frame sections 32 of the body support frame 28. Multiple fluid openings 18 extend through the body panels 14*a* of the vehicle body 14 in a selected pattern. Each spray conduit 36 is disposed in fluid communication with at least one fluid opening 18. As further shown in FIG. 2, a valve 37, the controls (not shown) of which are provided typically in the cabin 16, may be provided in each spray conduit 36. In typical operation of the firefighting vehicle 1, which will be hereinafter described, the tank 34 is filled with a fire-quenching fluid 42 such as water, for example. The pump 35 is operated and the valves 37 in the respective spray conduits 36 are opened to facilitate the pumping of fluid 42 from the tank 34, through the respective spray conduits 36 and open valves 37 and discharged through the respective fluid openings 18 in the body panels 14***a* of the vehicle body 14.

In typical application, the firefighting vehicle 1 is used to quench a fire (not shown) such as a forest fire or a burning building, for example. Accordingly, by operation of the engine 3 and track assemblies 4, the firefighting vehicle 1 is typically driven close to or through the fire. By operation of the pump 35 and valves 37 (FIG. 2), the fire-quenching fluid 42 is sprayed through the fluid openings 18 in the vehicle body 14 and onto the fire, quenching the fire.

It will be appreciated by those skilled in the art that the firefighting vehicle 1 enables firefighting personnel to dispense the fire-quenching fluid 42 onto the fire from within the fire rather than being limited to the edges of the fire, enhancing the efficiency of the firefighting effort. The tapered configuration of the nose body portion 15 enables the firefighting vehicle 1 to traverse burning debris and the like as the fire-quenching fluid 42 is sprayed onto the fire. Furthermore, due to the various orientations of the angled body panels 14*a*, the fluid 42 is sprayed onto the fire at various angles, enhancing the fire-quenching efficiency.

While the preferred embodiments of the invention have been described above, it will be recognized and understood that various modifications can be made in the invention and the appended claims are intended to cover all such modifications which may fall within the spirit and scope of the invention.

What is claimed is:

1. A firefighting vehicle, comprising:

a portable vehicle frame;

an engine carried by said portable vehicle frame;

a pair of track assemblies;

wherein said pair of track assemblies comprises a front axle and a rear axle carried by said vehicle frame, a pair of front wheels carried by said front axle, a pair of rear wheels carried by said rear axle and a pair of tracks drivingly engaged by said pair of front wheels and said pair of rear wheels;

wherein at least one of said front axle and said rear axle is drivingly engaged by said engine;

a body support frame carried by said vehicle frame;

a vehicle body carried by said body support frame and having a plurality of body panels disposed in obtuse angular relationship with respect to each other;

wherein said body support frame comprises a plurality of inner frame sections carried by said vehicle frame, a plurality of connecting members extending from said plurality of inner frame sections and a plurality of outer frame sections carried by said plurality of connecting members, and wherein said vehicle body is carried by said plurality of outer frame sections;

a plurality of fluid openings provided in each of said plurality of body panels;

a tank provided on said vehicle frame; and a pump disposed in fluid communication with said tank and said plurality of fluid openings.

2. The firefighting vehicle of claim 1 wherein said plurality of inner frame sections are disposed at a generally obtuse angle with respect to each other and said plurality of outer frame sections are disposed at a generally obtuse angle with respect to each other.

3. The firefighting vehicle of claim 1 further comprising a plurality of spray conduits connecting said pump and said plurality of fluid openings.

4. The firefighting vehicle of claim 3 further comprising a plurality of valves provided in said plurality of spray conduits, respectively.

5. The firefighting vehicle of claim 1 wherein said vehicle body comprises a generally tapered nose body portion, a generally elongated main body portion extending from said nose body portion and a tail body portion extending from said main body portion.

* * * * *